United States Patent

Bawa et al.

[11] Patent Number: 5,763,833
[45] Date of Patent: *Jun. 9, 1998

[54] ELECTRICAL CONNECTOR FITTING

[75] Inventors: Jaspal S. Bawa, Memphis, Tenn.; Luis R. Couto, Hillside; Giacomo J. Mancini, Piscataway, both of N.J.

[73] Assignee: Thomas & Betts Corporation, Memphis, Tenn.

[*] Notice: The term of this patent shall not extend beyond the expiration date of Pat. No. 5,321,205.

[21] Appl. No.: 496,790

[22] Filed: Jun. 29, 1995

Related U.S. Application Data

[63] Continuation of Ser. No. 245,173, May 17, 1994, abandoned, which is a continuation of Ser. No. 6,006, Jan. 15, 1993, Pat. No. 5,321,205.

[51] Int. Cl.[6] .................................................. H02G 3/18
[52] U.S. Cl. ................................ 174/65 SS; 285/136.1; 285/139.1; 439/394
[58] Field of Search .......................... 174/65 SS, 174, 174/285, 439

[56] References Cited

U.S. PATENT DOCUMENTS 5,321,205  6/1994  Bawa et al. ..................... 174/65 SS

FOREIGN PATENT DOCUMENTS 2106336  4/1983  United Kingdom .............. 174/65 SS

*Primary Examiner*—Kristine L. Kincaid
*Assistant Examiner*—Dean A. Reichard
*Attorney, Agent, or Firm*—Michael L. Hoelter; Salvatore J. Abbruzzese

[57] ABSTRACT

A connector for terminating a metal clad electrical cable is suitable for use in hazardous locations. The connector includes an elongate generally cylindrical body having a cable receiving end, a conductor egressing end, and a central axial bore therethrough. An elongate generally cylindrical hub accommodates the body. The hub has a body receiving end, a conductor egressing end, and a central axial bore therethrough. A capable seal is provided by a sealing bushing and a gland nut which is rotatably coupled to the cable receiving end of the body, sealingly coupling the cable to the body. The body and the hub include cooperative engagement elements for preventing the relative rotation of the hub and the body upon rotatably coupling the gland nut to the body about the cable.

9 Claims, 2 Drawing Sheets

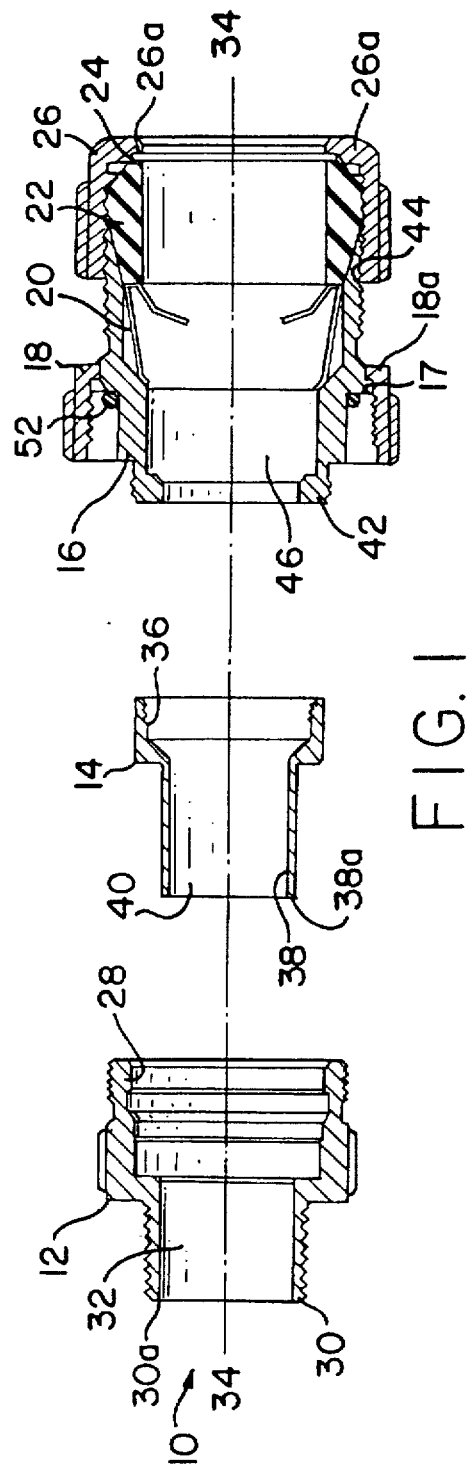
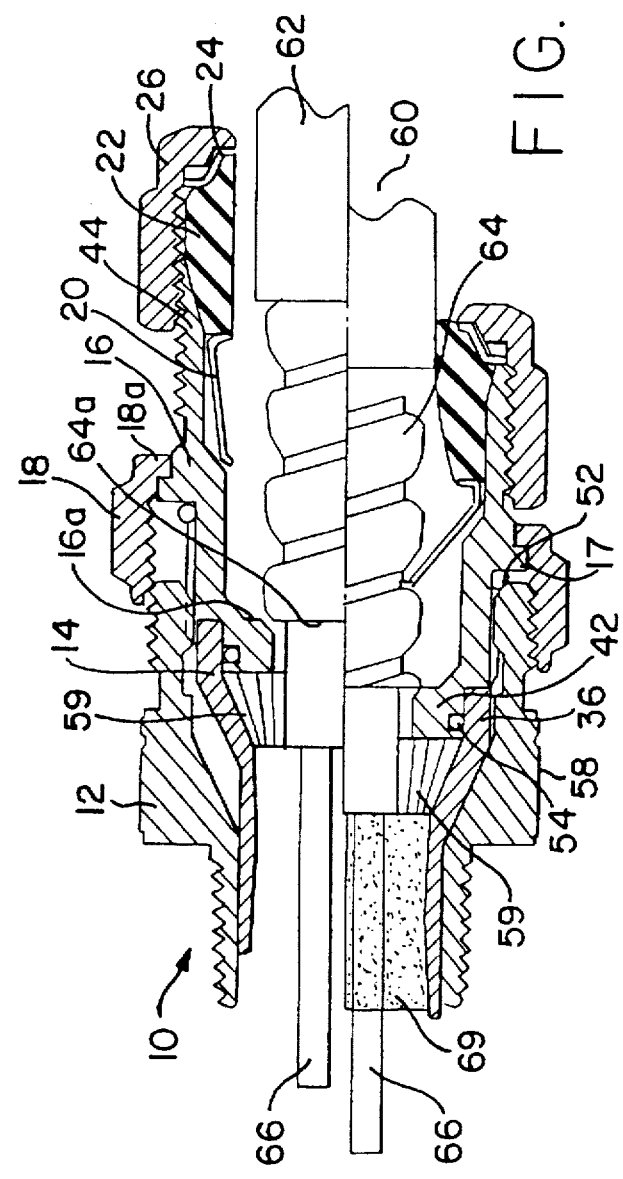

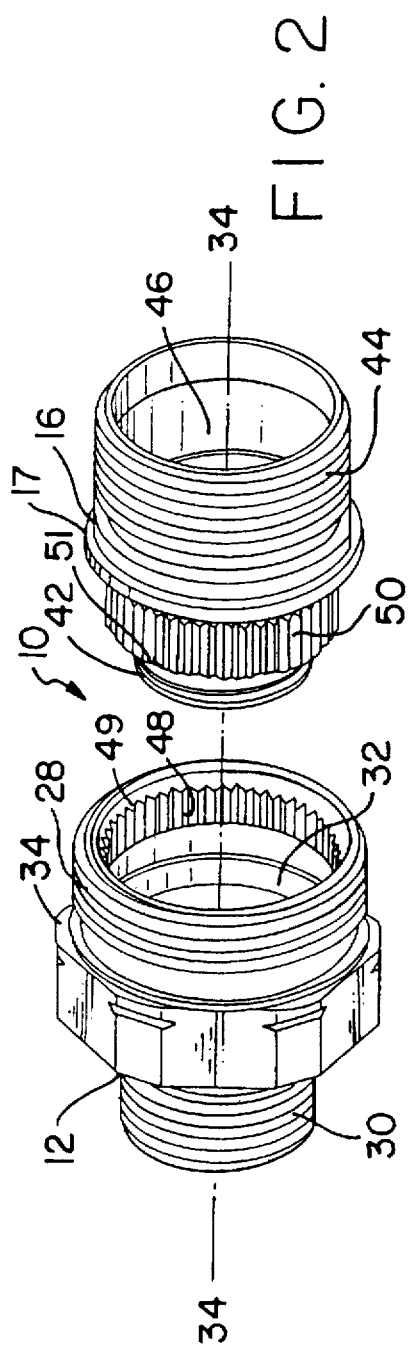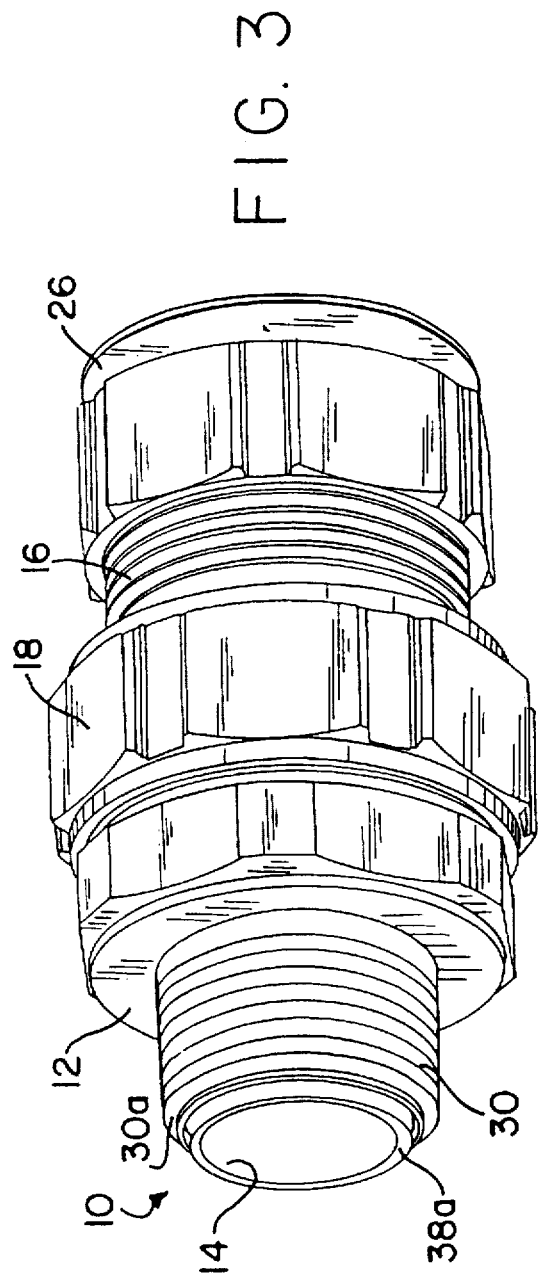

ELECTRICAL CONNECTOR FITTING

This is a continuation of application Ser. No. 08/245,173, filed May 17, 1994, for an Electrical Connector Fitting, now abandoned which is a continuation of application Ser. No. 08/006,006 filed on Jan. 15, 1993, and now U.S. Pat. No. 5,321,205.

FIELD OF INVENTION

The present invention relates to a connector for terminating electrical cable. More particularly, the present invention relates to an improved connector fitting for terminating jacketed metal clad cable for use in hazardous locations.

BACKGROUND OF THE INVENTION

Connector fittings used to terminate metal clad electrical cable typically include multiple components including cable hubs, bodies, gland nuts, ground cones, and the like. The number of fitting components is increased where a connector is designed to terminate cable in hazardous locations. In such instances, further connector components, including a sealing sleeve, are necessary in order to accommodate a sealing compound within the fitting to prevent the migration of hazardous gases through the connector. One example of a typical hazardous location fitting is shown in U.S. Pat. No. 4,549,037, issued Oct. 22, 1985.

With the many components necessary to provide an effective hazardous location fitting, terminating the connector as well as mounting the connector in the desired location becomes more difficult. The installer must correctly assemble the various components of the fitting. The cable must be properly terminated with the fitting. Finally, the fitting must be installed to the desired equipment enclosure.

Attempts to fully terminate the fitting on the cable prior to mounting to the enclosure result in rendering the mounting more difficult. Similarly, mounting the fitting to the enclosure prior to terminating the cable to the fitting renders that termination more difficult. In the latter instance, an attempt to tighten the gland nut to the body around the cable may result in some of the intermediate components twisting or spinning. This further increases the difficulty of terminating the cable in the fitting and could result in an ineffective termination.

It is, therefore, desirable to provide an electrical connector fitting which will permit the easy termination of a metal clad electrical cable to a connector fitting and which will also permit the easy mounting of the connector fitting to the desired enclosure.

SUMMARY OF THE INVENTION

It is an object of the present invention to provide an electrical connector for terminating a jacketed metal clad cable.

It is a more particular object of the present invention to provide a hazardous location connector which permits the easy termination of the cable in the connector and facilitates the mounting of the connector to the desired enclosure.

In the efficient attainment of these and other objects, the present invention provides a connector for terminating an electrical cable having an insulated jacket and plural conductors extending therethrough. The connector includes an elongate cylindrical body having a cable receiving end, a conductor egressing end and a central axial bore extending therethrough. The connector further includes an elongate, generally cylindrical body accommodating hub having a body receiving end, a conductor egressing end and a central axial bore therethrough, which is axially aligned with the bore of the body. Cable sealing means is rotatably coupled to the cable receiving end of the body to sealingly couple the cable to the body. The body and the hub include cooperative engagement means for preventing relative axial rotation of the hub and the body upon rotatably coupling the sealing means to the body.

In the preferred embodiment shown herein, the cable sealing means includes a gland nut rotatably secured to the cable receiving end of the body and an annular elastomeric sealing member positioned between the body and the gland nut for frictional engagement with the cable jacket upon coupling of the gland nut to the body. The cooperative engagement means includes interlocking splined members on the external surface of the body and the internal surface of the hub, which prevent the relative rotation of the body in the hub when the gland nut is rotatably secured to the body.

BRIEF DESCRIPTION OF THE DRAWING

FIG. 1 is an exploded sectional view of the component parts of the hazardous location electrical connector of the present invention.

FIG. 2 is a perspective showing of the hub and body of the connector of FIG. 1.

FIG. 3 is a perspective showing of the hazardous location electrical connector of FIG. 1.

FIG. 4 is a longitudinal cross-sectional view of the electrical connector of FIG. 1, including a metal clad cable terminated therein with the upper portion of FIG. 4 showing the connector loosely accommodating the cable and the lower portion of FIG. 4 showing the connector secured to the cable.

DETAILED DESCRIPTION OF THE PREFERRED EMBODIMENT

The hazardous location electrical cable connector 10 of the present invention is shown in FIGS. 1–3. Connector 10 includes a hub 12, a sealing sleeve 14, a body 16, a coupler 18, a grounding element 20, a sealing bushing 22, a retaining washer 24 and a gland nut 26. The components of connector 10 are arranged for assembly as shown in FIG. 1, along longitudinal central axis 34.

Each of the above enumerated components with the exception of sealing bushing 22 are formed of a suitably conductive metal. In the present illustrated embodiment, aluminum is the preferred metal. Sealing bushing 22 is formed of a non-conductive, suitably elastomeric material such as rubber.

Hub 12 is an elongate hollow generally tubular member having an enlarged body receiving end 28, which is externally screw threaded, and a smaller opposed conductor egressing end 30, which is also externally screw threaded. Hub 12 includes an internal central bore 32, which is concentric with axis 34. Hub 12 includes an external hexagonal configuration which permits engagement by a suitable tool (not shown) to permit termination and installation.

Sealing sleeve 14 is generally a hollow cylindrical member having an enlarged internally screw-threaded body attachment end 36 and an opposed hub insertion end 38. A central bore 40, which is also concentric with axis 34, extends therethrough. Hub insertion end 38 of sealing sleeve 14 is constructed to reside within bore 32 of hub 12. A distal extent 38a of insertion end 38 is designed to extend slightly beyond a distal extent 30a of hub 12 (FIG. 3).

Body 16 is generally an elongate tubular member having an external screw-threaded hub insertion end 42, an opposed externally screw-threaded cable receiving end 44, and a central bore 46 therethrough.

Coupler 18 is generally an annular member having a hexagonal outer configuration also for engagement with a suitable tool and is internally screw threaded for screw cooperation with body receiving end 28 of hub 12. The rearmost end 18a of coupler 18 is turned radially inwardly to define a flange, which engages an outwardly extending shoulder 17 of body 16 to captively retain coupler 18 thereon.

Gland nut 26 is generally an annular member also having a hexagonal outer configuration and is internally screw threaded for screw cooperation with the externally threaded exterior portion of cable receiving end 44 of body 16. The rearmost end 26a of gland nut 26 is also radially inwardly turned to define a flange of reduced diameter.

Sealing bushing 22 is generally an annular member which is positioned between gland nut 26 and cable receiving end 44 of body 16. Sealing bushing 22 is designed to seal the cable (FIG. 4) upon termination thereto. A ring-like retaining washer 24 is positioned between sealing bushing 22 and flange 26a of gland nut 26.

Grounding element 20 is positioned between sealing bushing 22 and body 16. Grounding element 20 is operative to engage the cable (FIG. 4) upon termination thereto.

The interaction of body 16, grounding element 20, sealing bushing 22 and gland nut 26 and its ability to seal and ground an electrical cable supported therein (FIG. 4) is more fully shown and described in U.S. Pat. No. 5,059,747, issued Oct. 22, 1991, entitled "Connector for Use with Metal Clad Cable," which is incorporated by reference herein for all purposes.

Referring specifically to FIG. 2, hub 12 includes a circumferential internally splined surface 48 adjacent body receiving end 28. Splined surface 48 includes a plurality of raised spaced projections 49 which in the present embodiment are radially inwardly pointed. Splined surface 48 has a generally tooth-like configuration.

Similarly, body 16 includes a circumferentially outwardly splined surface 50 adjacent hub insertion end 42 thereof. As with inwardly splined surface 48 of hub 12, outwardly splined surface 50 of body 16 includes a plurality of spaced projections 51, which are radially outwardly pointed. Projections 51 of splined surface 50 are constructed to seat within the spaces formed between projections 49 of spline surface 48. A similar opposite relationship exists between projections 49 of splined surface 48 and the spaces between projections 51 of splined surface 50. This permits relative longitudinal movement of hub 12 and body 16 so that hub insertion end 42 of body 16 can be inserted into body receiving end 28 of hub 12. The interlocking of the spaces and projections of splined surfaces 48 and 50 prevents relative rotation of hub 12 with respect to body 16 about axis 34.

Having described the components of connector 10, use of connector 10 to terminate an electrical cable may now be described.

Referring now to FIGS. 1 and 4, connector 10 is used to terminate a metal clad electrical cable 60. Cable 60 includes an outer insulative jacket 62 which surrounds a scroll-type metallic cladding or sheath 64. A plurality of individually insulated conductors 66 extend through sheath 64. In order to terminate cable 60 in connector 10, the insulated jacket 62 is stripped back exposing an end extent of metallic sheath 64.

Connector 10 is initially assembled in the following manner. Sealing sleeve 14 is attached to body 16 by screwing body attachment end 36 to hub insertion end 42 of body 16. Gland nut 26 is loosely screw attached to cable receiving end 44 of body 16. Sealing bushing 22 and grounding element 20 are positioned between body 16 and gland nut 26, as is shown in FIG. 1. Hub 12 is loosely attached to body 16 by coupler 18. An elastomeric O-ring 52 may be positioned between shoulder 17 of body 16 and body receiving end 28 of hub 12 to provide a seal therebetween.

The loosely coupled connector 10 is shown in the upper half of FIG. 4. The embodiment shown in FIG. 1 includes the attachment of sealing sleeve 14 to body 16 by screw connection of body attachment end 36 to hub insertion end 42. In the embodiment shown in FIG. 4, sealing sleeve 14 includes a tapered body attachment end 36, which seats over hub insertion end 42 in a force-fitted relationship. In this embodiment, a further elastomeric O-ring 54 may be employed to seal the attachment of sealing sleeve 14 to body 16.

Referring now to the upper half of FIG. 4, cable 60 is prepared as described above, having an exposed end extent of metallic sheath 64 extending out from insulative jacket 62. Cable 60 is inserted into connector 10 through gland nut 26 and through the cable receiving end 44 of body 16. Engagement is made between grounding element 20 and metallic sheath 64 as is described in the above-identified '747 patent. Cable 60 is inserted into connector 10 until an outer edge 64a of metallic sheath 64 abuts against an internal shoulder 16a of body 16.

Cable 60 may now be sealed in connector 10. Connector 10 is firmly grasped by applying an appropriate tool (not shown) such as a wrench, to hub 12. Gland nut 26 is screw tightened to cable receiving end 44 of body 16, urging sealing bushing 22 into frictional sealing engagement with jacket 62 of cable 60. The frictional engagement of sealing bushing 22 with body 16 and jacket 62 during screw tightening of gland nut 26 is such that body 16 would have a tendency to axially rotate within hub 12. However, relative axial rotation of body 16 with respect to hub 12 is prevented by the interengagement of splined surfaces 48 and 50 of hub 12 and body 16 respectively. Thus, with hub 12 secured by an appropriate tool, gland nut 26 may be tightened about body 16 to create a seal amoung sealing bushing 22, body 16 and insulative jacket 62 without risk of having body 16 rotate within hub 12. While the present embodiment employs splined surfaces 48 and 50 to interlock hub 12 and body 16, other forms of mechanical engagement may be employed.

Once gland nut 26 is tightened around body 16, cable 60 will be securely positioned within connector 10 as is shown in the lower half of FIG. 4. Coupler 18 may then be loosened, detaching hub 12 from the remainder of connector 10. Hub 12 may, if desired, then be individually screw connected to an electrical enclosure (not shown).

Sealing sleeve 14 may now be filled with a sealing compound 69 to provide a seal around conductors 66. A putty-type or liquid compound may be employed. These compounds, which are well-known in the art, harden to provide a seal around conductors 66. Particularly when using a liquid compound and for the tapered sealing sleeve 14 of FIG. 4, several wraps of tape 59 may be used around conductors 66 adjacent outer edge 64a of metallic sheath 64. This will close one end of sealing sleeve 14 to permit it to be filled with the sealing compound 69. The filling of sealing sleeve 14 may be accomplished in a manner shown and described in the above-identified '037 patent.

After the sealing sleeve 14 has been filled with compound 69, hub 12 may be reconnected to the remainder of connector 10. Coupler 18 is screw attached to body receiving end 28 of hub 12 and is tightened therearound. O-ring 52 is compressed therebetween effecting a seal thereat.

When connected in the manner described above, a completely sealed termination of cable 60, suitable for use in hazardous locations is achieved.

Various changes to the foregoing described and shown structures would now be evident to those skilled in the art. Accordingly, the particularly disclosed scope of the invention is set forth in the following claims.

We claim:

1. A connector for terminating a metal-clad cable having an insulative jacket and plural conductors extending therethrough comprising:

an elongate generally cylindrical body having a cable receiving end, a hub insertion end, and a central axial bore extending therethrough;

an elongate, generally cylindrical hub configured for attachment to said body and having a body receiving end, a conductor egressing end, and a central axial bore extending therethrough, said bore of said hub being axially aligned with said bore of said body;

cable sealing means rotatably coupled to said cable receiving end of said body for sealingly coupling said cable to said body;

a grounding element supported by said body for engagement with said metal cladding of said cable;

a sealing sleeve supported between said body and hub and being exteriorly accessible when the hub is removed for accommodating a sealing compound therein, said sealing sleeve and body including mating engagement means for mechanically coupling said sealing sleeve to said hub insertion end of said body; and a sealing ring positioned between said hub and said body for sealing said attachment of said hub to said body at said body receiving end of said hub.

2. A connector of claim 1 wherein said body includes a shoulder projecting outwardly therefrom; and wherein said sealing ring includes an elastomeric o-ring disposed on the outer surface of said body between said shoulder and said body receiving end of said hub.

3. A connector of claim 2 wherein said elastomeric o-ring abuts against said shoulder.

4. A connector or claim 2 wherein said elastomeric o-ring engages a surface of said hub for forming a seal thereat.

5. A connector of claim 4 wherein said elastomeric o-ring is compressed between said body shoulder and said hub surface.

6. A connector of claim 2, further including cooperative engagement means on said body and said hub for preventing relative axial rotation of said hub and said body upon said rotatable coupling of said sealing means to said cable receiving end of said body and wherein the elastomeric o-ring is positioned between said shoulder and said cooperative engagement means of said body.

7. A connector of claim 1, wherein the mating engagement means comprises mating threads on the sealing sleeve and hub insertion end of said body.

8. A connector of claim 1, further including cooperative engagement means on said body and said hub for preventing relative axial rotation of said hub and said body upon said rotatable coupling of said sealing means to said cable receiving end of said body.

9. A connector of claim 1, wherein the body includes an internal shoulder proximate the hub insertion end for abutting said metallic sheath of said cable positioned within the connector.

* * * * *